Figure 1:
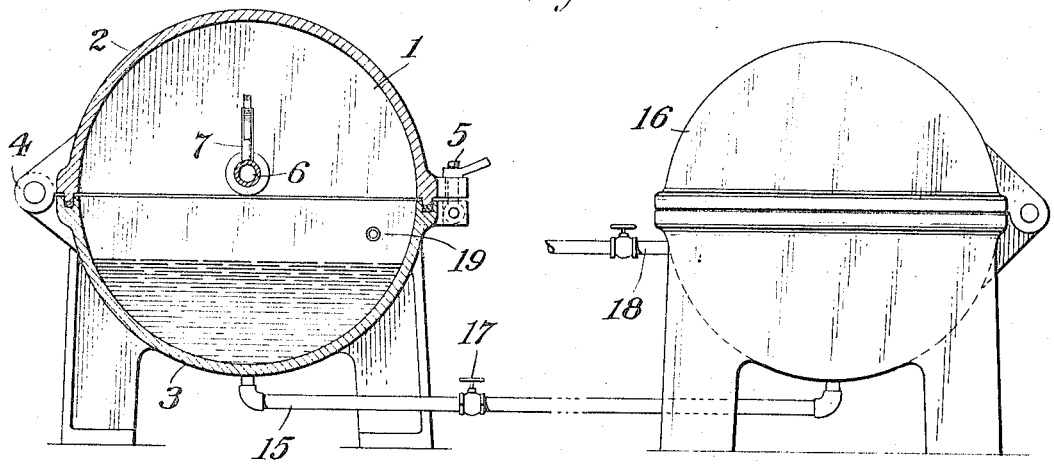

R. B. PRICE.
APPARATUS FOR PRODUCING VULCANIZED ARTICLES.
APPLICATION FILED MAY 3, 1915.

1,169,733.

Patented Jan. 25, 1916.
2 SHEETS—SHEET 1.

Witness:
S. G. Taylor

Inventor
Raymond B. Price,
By his Attorney
Ernest Stephens

R. B. PRICE.
APPARATUS FOR PRODUCING VULCANIZED ARTICLES.
APPLICATION FILED MAY 3, 1915.

1,169,733.

Patented Jan. 25, 1916.
2 SHEETS—SHEET 2.

WITNESS:
S. G. Taylor

INVENTOR
Raymond B. Price.

BY
Ernest Hopkins
HIS ATTORNEY

UNITED STATES PATENT OFFICE.

RAYMOND B. PRICE, OF NEW YORK, N. Y., ASSIGNOR TO RUBBER REGENERATING COMPANY, A CORPORATION OF INDIANA.

APPARATUS FOR PRODUCING VULCANIZED ARTICLES.

1,169,733.  Specification of Letters Patent.  Patented Jan. 25, 1916.

Application filed May 3, 1915. Serial No. 25,401.

*To all whom it may concern:*

Be it known that I, RAYMOND B. PRICE, a citizen of the United States, residing in the city of New York, county and State of New York, have invented certain new and useful Improvements in Apparatus for Producing Vulcanized Articles, of which the following is a full, clear, and exact description.

This invention relates to an apparatus for forming vulcanizable articles of rubber and similar materials and such apparatus as those employed in carrying out the process described and claimed in my co-pending application Serial No. 2733 of 1915, filed January 16, 1915.

In the manufacture of dipped vulcanized plastic articles, the practice heretofore has been to accumulate the vulcanizable plastic upon a form by repeatedly dipping the form in a solution of the plastic, and subjecting the form and the plastic thereon after each dipping to atmospheric air for a sufficient interval of time to remove the solvent from the plastic solution by evaporation. This old and well known practice has certain disadvantages both as to the time consumed in drying and as to defects in and lack of uniformity in the thickness or gage of different portions of the same article, or different articles which have undergone exactly the same treatment. These conditions arise in part from the presence of moisture and dust particles in atomspheric air and the variances in the quantity of both moisture and dust from time to time.

The evaporation of the solvent contained in the plastic upon a form has the effect of chilling the form with a resultant condensation of moisture contained in the air upon the plastic. The presence of this moisture reduces the area of the article from which the volatilization of the solvent may be effected, with a resultant prolongation of the time required to properly condition the plastic for another dip or for subjection to a vulcanizing medium. Furthermore, if this condensate is not entirely removed before the form is again dipped in the solution, there is likelihood of blisters being formed. When the article is vulcanized by the cold cure process, the presence of moisture in the body of the article may result in the formation of hydrochloric acid in the article, thus causing rapid deterioration and poor aging properties.

With the old and well known method above referred to, the recovery of the solvent is difficult, and the waste of the solvent great. Furthermore, the escape of the solvent subjects the workmen to the danger of gas intoxication, which can be guarded against only by elaborate systems of ventilating devices.

Through the use of my improved apparatus, I am not only enabled to effect a very material reduction in the time required to prepare a dipped article for vulcanization, as compared with the old and well known devices, but to remove the solvent from the plastic deposited upon the form at each dipping under conditions which preclude all possibility of moisture being deposited on the surface of the article during drying with a resultant elimination of possibility of those defects in the completed article arising from condensation of the moisture of the air upon the article.

The drying of the article within an inclosed space and in the presence of a sub-atmospheric pressure or vacuum, also has the advantage that the solvent removed by evaporation of volatilization from the plastic may be readily recovered and danger of gas intoxication is avoided without the expense of, or waste incidental to the apparatus heretofore used to protect the workmen. Furthermore, the dangers of the formation of an explosive mixture of the volatile solvent and air is reduced to a minimum.

The present invention comprises an apparatus for carrying out the process of the above mentioned application, and broadly consists in providing a chamber containing a vulcanizable plastic into which the forms carried on suitable frames may be dipped successively, said forms then being subjected to the action of a vacuum, or partial vacuum, so as to aid evaporation of the solvent while at the same time the forms may be heated to further increase evaporation. Such vacuum treatment may be carried on in the same chamber in which the dipping occurs, or in a separate chamber, as will be hereinafter more fully described and claimed in the accompanying claims.

Figure 2:
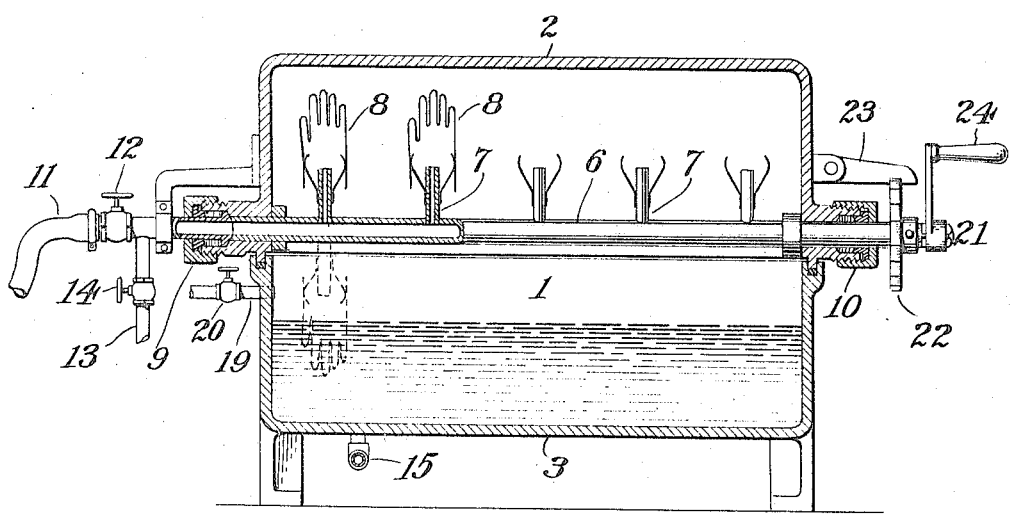
Figure 3:
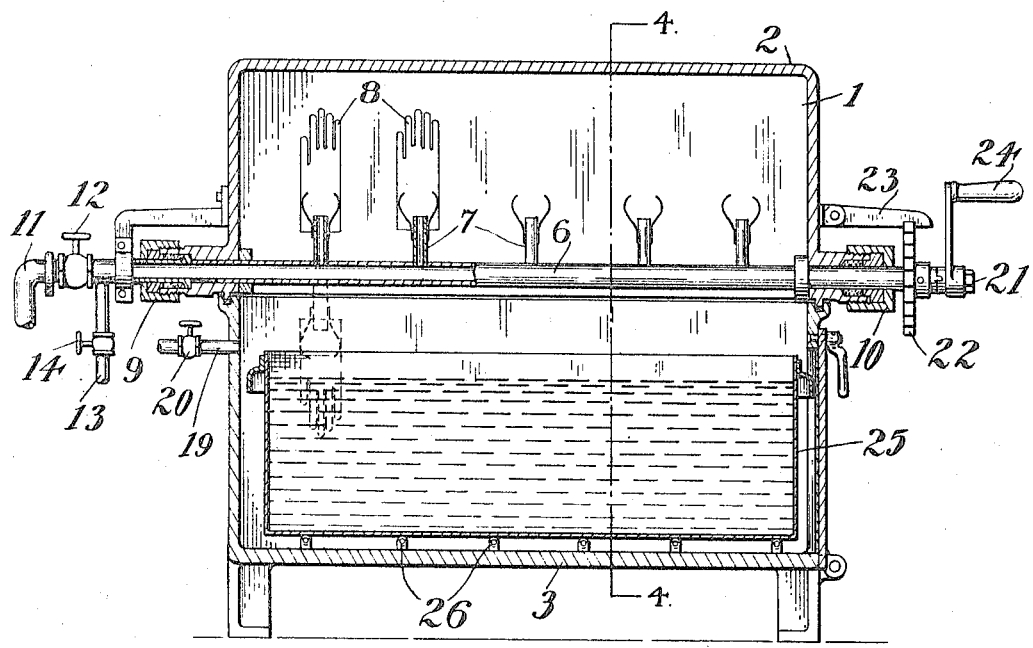

Referring to the drawings: Figure 1 is an end elevation of apparatus for dipping articles to be made, the dipping chamber being shown in vertical section. Fig. 2 is a vertical longitudinal view of the dipping apparatus. Fig. 3 is a longitudinal sectional view of a modified form of dipping apparatus; and Fig. 4 is a transverse sectional view of the same taken on the line 4—4 of Fig. 3.

Referring to Fig. 1 of the drawings, the numeral 1 indicates a suitable casing forming a chamber in which the dipping is accomplished. This casing may be made in any suitable way, or in any suitable shape, but I have shown the same consisting of two semi-cylindrical parts 2 and 3 united together as at 4, and having suitable clamping bolts 5. These two parts are so constructed as to be hermetically sealed in any well known way. Within the casing 1 and preferably located axially thereof, is a hollow support or pipe 6 which has attached thereto branching tubes or nipples 7 which are to carry forms 8 which will give the required shape to the article being made, which in this instance is indicated as being a rubber glove. The pipe 6 passes through the ends of the casing 1 and is provided with suitable stuffing boxes 9 and 10 to allow the rotation of the pipe and prevent the ingress of air or the escape of any volatile components of the material within the chamber. The pipe 6 connects with a suitable supply pipe 11 which may conduct steam from any suitable source of supply, and which, when the steam enters the forms 8, serves to heat them during the process of evaporation. A suitable valve 12 is provided for controlling the flow of steam and also a branch pipe 13 with a valve 14 for enabling the water of condensation to be removed. The lower section 3 of the casing is provided with a suitable eduction pipe 15 which connects with a supply tank or chamber 16 constructed in any suitable or preferred manner. The pipe 15 is also provided with a valve 17 to control the flow of the liquid therethrough. The chamber 16 may also be provided with an inlet pipe 18 which may be connected with a suitable source of vacuum for the purpose of withdrawing the rubber solution from the chamber 1. This withdrawal of the solution from the chamber 1 may also be accomplished by gravity, when the chamber 16 is located on a lower level than the chamber 1. The rubber solution may also be forced out of the chamber 1 by gas under pressure which may be supplied through a pipe 19 controlled by valve 20. This pipe may also be utilized through suitable connections for producing a vacuum within the chamber 1, or for introducing a heated fluid for vulcanizing purposes if it is desired to vulcanize the articles in the same chamber. The pipe 6 is provided with a suitable projecting shaft 21 on which is mounted a toothed wheel 22 which coöperates with a pawl 23 to hold the forms 8 on shaft 6 in any desired position. A crank handle 24 is provided for rotating the shaft 21 and also the pipe 6.

The apparatus above described is utilized in the following way in the forming of vulcanizable rubber goods: The forms 8 are placed in position on the nipples or supports 7, the casing 1 is then closed, steam is admitted through the pipe 11 to the forms 8 and a suitable quantity of rubber solution is forced into the lower part of the chamber, as indicated in Figs. 1 and 2. The pawl 23 is then disengaged from the toothed wheel 22 and the handle 24 rotated so as to pass the forms through the body of the rubber solution, as indicated in dotted lines in Fig. 2. The dipping may be repeated a suitable number of times, after which the rubber solution is forced or withdrawn from the chamber 1 into the container 16. The valve 17 is then closed and a vacuum produced within the chamber through the pipe 19. This produces a very rapid evaporation of the solvent in the coating which has been applied to the forms 8 and in connection with the heat supplied through the pipes 11 and 6, causes the coatings to dry very rapidly. The pipe 19 may be connected with any suitable condenser by means of which the volatile components of the solution may be condensed and thereby recovered. The valve 17 is then opened and the rubber solution again allowed to enter the chamber 1 so that the dipping operation may be repeated. This completes one cycle in the use of the machine and may be repeated a sufficient number of times to give the required thickness to the article being formed on the forms 8. The pipe 19 may then be utilized to supply gas under pressure for the purpose of compacting the layer of rubber on the forms and may be used for supplying any other fluid, gas, or material which may be used in the treatment of the article being formed.

Figure 4:
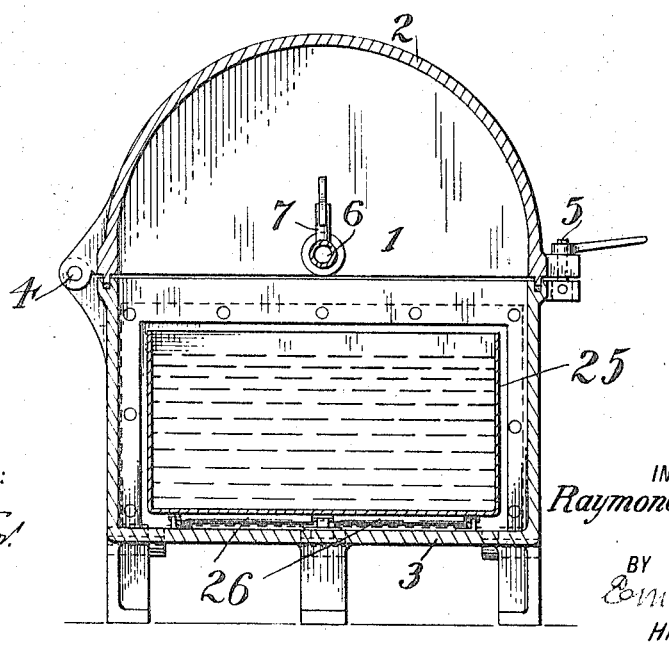

In the modified form of dipping apparatus shown in Figs. 3 and 4, the rubber solution is placed in a movable tray or tank 25 which is adapted to be inserted in and removed from the dipping chamber. Suitable rollers 26 or other anti-friction devices are provided to permit easy moving of the tank. In other respects the dipping chamber is similar to that shown in Figs. 1 and 2. In this form of the apparatus the rubber solution is removed from the dipping chamber during the period of evaporation of the compound, thus preventing the heating of the solution and keeping the sides and bottom of the chamber free from any accumulation of the rubber compound. This form of the apparatus also lends itself particularly well to the vulcanization of articles within the chamber without being removed.

What I claim and desire to protect by Letters Patent is:

1. A dipping and drying apparatus comprising a dipping chamber adapted to contain material used in the manufacture of articles, a support on which forms for said articles are carried, means for moving said support to carry said forms into and out of said material, and means for producing a reduced fluid pressure about said forms.

2. A dipping and drying apparatus comprising a dipping chamber adapted to contain material used in the manufacture of articles, a support on which forms for said articles are carried, means for heating said forms interiorly, means for moving said support to carry said forms into and out of said material, and means for producing a reduced fluid pressure about said forms.

3. A dipping and drying apparatus comprising a dipping chamber adapted to contain material used in the manufacture of articles, a support on which forms for said articles are carried, means for moving said support to carry said forms into and out of said material, and means for intermittently producing a reduced fluid pressure about said forms between the dipping operations.

4. A dipping and drying apparatus comprising a dipping chamber adapted to contain the material used in the manufacture of articles, a support on which forms for said articles are carried, means for withdrawing said material from the presence of said forms, and means for producing a reduced fluid pressure about said forms when said material is removed.

5. A dipping and drying apparatus comprising a dipping chamber adapted to contain the material used in the manufacture of articles, a support on which forms for said articles are carried, means for heating said forms interiorly, means for withdrawing said material from the presence of said forms, and means for producing a reduced fluid pressure about said forms when said material is removed.

6. A dipping and drying apparatus comprising a dipping chamber adapted to contain the material used in the manufacture of articles, a support on which forms for said articles are carried, means for withdrawing said material from the presence of said forms, means for producing a reduced fluid pressure about said forms when said material is removed, a storage receptacle for said material and means for conveying said material from said receptacle into said chamber.

7. A dipping and drying apparatus comprising a dipping chamber adapted to contain the material used in the manufacture of articles, a rotary shaft on which forms for said articles are carried, means for rotating and locking said shaft, means for withdrawing said material from said chamber, and means for producing a reduced fluid pressure about said forms.

8. A dipping and drying apparatus comprising a dipping chamber adapted to contain the material used in the manufacture of articles, a rotary shaft on which forms for said articles are carried, means carried by said shaft and connected with said forms for supplying heat to the latter, and means for rotating and locking said shaft.

9. A dipping and drying apparatus comprising a dipping chamber adapted to contain the material used in the manufacture of articles, a hollow rotary shaft on which forms for said articles are carried and which communicate with the interior of said forms, means for rotating said shaft and holding said forms in different positions, and means for producing a reduced fluid pressure about said forms.

10. A dipping and drying apparatus comprising a dipping chamber adapted to contain the material used in the manufacture of articles, a movable support on which forms for said articles are carried, means for heating said forms interiorly, a storage receptacle connected with said chamber, means for forcing said material to and from said receptacle, and means for producing a reduced fluid pressure within said chamber.

Signed at New York, N. Y., this 30th day of April 1915.

RAYMOND B. PRICE.